United States Patent
Wierenga et al.

(10) Patent No.: US 9,922,182 B2
(45) Date of Patent: Mar. 20, 2018

(54) FINGERPRINT EMULATOR

(71) Applicant: Griffin Technology, LLC, Irvine, CA (US)

(72) Inventors: Aaron Wierenga, Nashville, TN (US); Jennifer Ann Murphy, Oakland, CA (US); Evan Reese, Nashville, TN (US)

(73) Assignee: Griffin Technology, LLC, Irvine, CA (US)

(*) Notice: Subject to any disclaimer, the term of this patent is extended or adjusted under 35 U.S.C. 154(b) by 211 days.

(21) Appl. No.: 14/593,991

(22) Filed: Jan. 9, 2015

(65) Prior Publication Data

US 2016/0205292 A1   Jul. 14, 2016
US 2018/0004923 A9   Jan. 4, 2018

Related U.S. Application Data

(66) Substitute for application No. 61/937,624, filed on Feb. 10, 2014.

(60) Provisional application No. 61/925,231, filed on Jan. 9, 2014.

(51) Int. Cl.
*G06F 21/32* (2013.01)
*G06K 9/00* (2006.01)
*G06F 21/35* (2013.01)
*G06F 21/34* (2013.01)

(52) U.S. Cl.
CPC .............. *G06F 21/32* (2013.01); *G06F 21/35* (2013.01); *G06K 9/00013* (2013.01); *G06F 21/34* (2013.01)

(58) Field of Classification Search
CPC ............... H04B 1/385; G06K 9/00013; G06K 9/00087; G06F 3/017; G06F 1/163; G06F 21/32; G06F 21/34; G06F 21/35; H04N 5/2252
USPC ................................ 340/5.53, 5.52; 382/124
See application file for complete search history.

(56) References Cited

U.S. PATENT DOCUMENTS

| | | | | |
|---|---|---|---|---|
| 9,495,575 | B2 * | 11/2016 | Kim ........................ | H04B 1/385 |
| 2015/0028996 | A1 * | 1/2015 | Agrafioti ................. | G06F 21/40 340/5.82 |
| 2015/0379255 | A1 * | 12/2015 | Konanur ................. | G06F 21/35 726/19 |

* cited by examiner

*Primary Examiner* — Ali Neyzari
(74) *Attorney, Agent, or Firm* — Manatt, Phelps & Phillips, LLP

(57) ABSTRACT

An access key for a device having a fingerprint activated lock includes an electrically conductive member having surface features formed on a surface thereof that can be recognized by the fingerprint activated lock as a unique fingerprint. A second electrically conductive member is electrically coupled to the first electrically conductive member. The second electrically conductive member is electrically coupled to the body of a user such that the sensor recognizes the first electrically conductive member as a fingerprint. The second electrically conductive member is preferably a ring, stylus or gripping portion upon which the first electrically conductive member is mounted. The electrically conductive member is preferably constructed from a capacitive elastomer such as an electrically conductive silicone. The access key functions as a synthetic fingerprint to limit access to a system to a possessor of the key. Access to the system provided by key can be limited to a predetermined period of time or a selected geographic area.

7 Claims, 2 Drawing Sheets

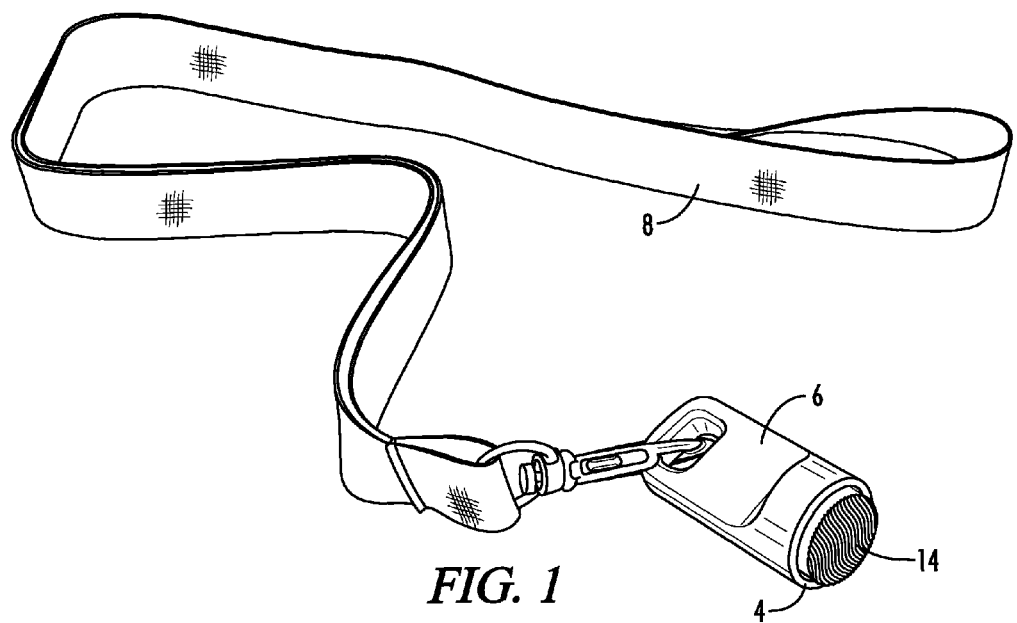
FIG. 1
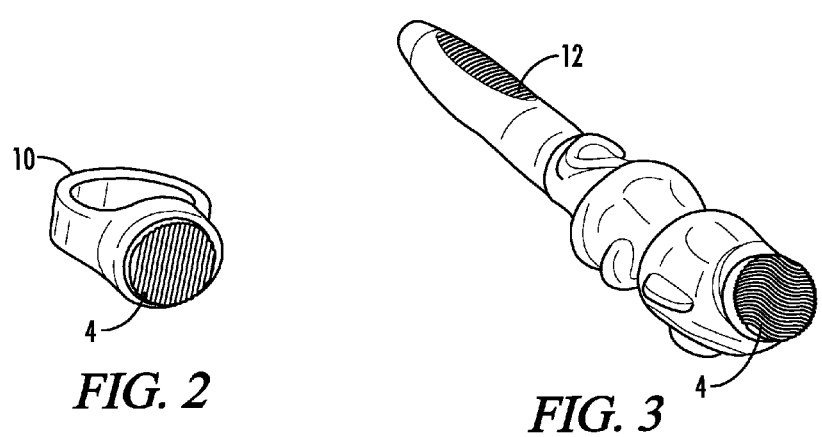
FIG. 2
FIG. 3

FINGERPRINT EMULATOR

CROSS-REFERENCES TO RELATED APPLICATIONS

The present Utility Patent Application is based upon and claims priority from U.S. Provisional Patent Application No. 61/925,231 filed Jan. 9, 2014 entitled "Fingerprint Emulator", and U.S. Provisional Patent Application No. 61/937,624 filed Feb. 10, 2014 entitled "Fingerprint Emulator"

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

Fingerprint identification sensors that can detect and identify human fingerprints are increasingly used to secure computers, mobile phones and sensitive facilities. Unfortunately, the unique nature of the human fingerprint makes it impossible to transfer or share them between individuals. Therefore, any changes or transfers in authorizations require the entry of new fingerprints into the system. Therefore, what is needed is an improved way to use existing fingerprint identification sensors to provide a transferable authorization solution.

BRIEF SUMMARY OF THE INVENTION

An embodiment of the present invention is directed toward an access key for a device having a fingerprint activated lock. The access key includes an electrically conductive member having surface features formed on a surface thereof that can be recognized by the fingerprint activated lock as a fingerprint. A second electrically conductive member is electrically coupled to the electrically conductive member. The second electrically conductive member is adapted to be electrically coupled to the body of a user such that the sensor recognizes the electrically conductive member as a fingerprint. The second electrically conductive member is preferably a ring, stylus or gripping portion and the electrically conductive member is mounted on the second conductive member. The electrically conductive member is preferably constructed from a capacitive elastomer such as an electrically conductive silicone.

An embodiment of the present invention is also directed toward a method of controlling access to a device having a fingerprint identification sensor. In accordance with the method, identifiable surface features are formed on an electrically conductive member constructed from a capacitive elastomer and/or electrically conductive silicone. A second electrically conductive member electrically coupled to the electrically conductive member is used to electrically couple the first electrically conductive member to the body of a user. The first electrically conductive member is then used to engage the fingerprint identification sensor which is able to uniquely identity the electrically conductive member. The first electrically conductive member is thus used to limit access to a system to a possessor of the electrically conductive member. Access to the system provided by the electrically conductive member can also be limited to a predetermined period of time or a selected geographic area.

BRIEF DESCRIPTION OF THE SEVERAL VIEWS OF THE DRAWINGS

FIG. 1 is an illustration of an embodiment of the present invention mounted on a finger grip and adapted to be held around the neck of a user;

FIG. 2 is an illustration of an embodiment of the present invention mounted on a ring;

FIG. 3 is an illustration of an embodiment of the present invention mounted on a computer stylus.

DETAILED DESCRIPTION OF THE INVENTION

Figure 4:
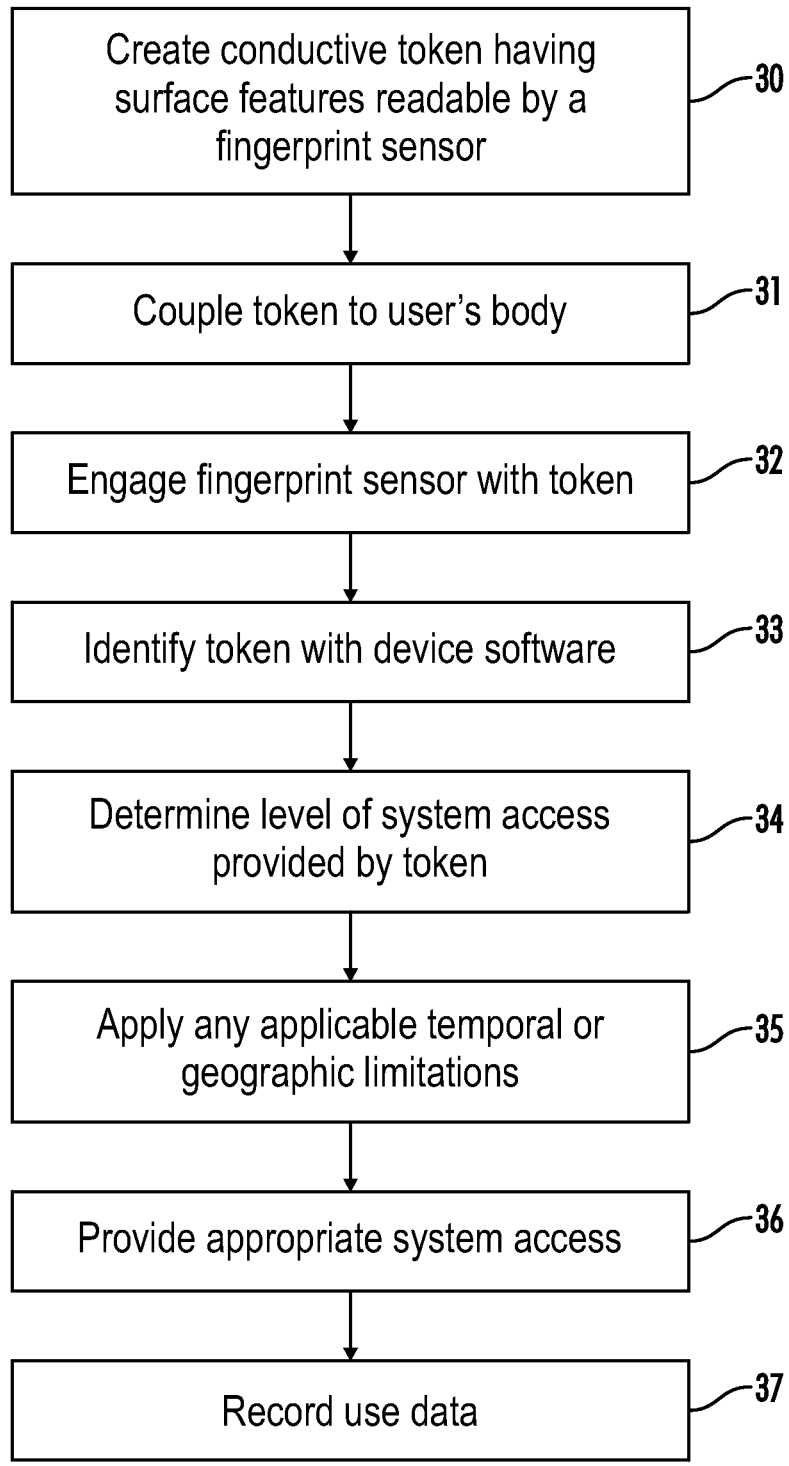
FIG. 4 is a flow chart of a method of providing limited access to a system using a fingerprint sensor in accordance with an embodiment of the present invention.

The present invention emulates a human fingerprint by molding features such as ridges, peaks and valleys, onto a main emulator surface, using an emulator material such as a capacitive elastomer compound. By doing so, the present, invention creates a unique identifier than can be recognized by a standard fingerprint reader, yet passed among individuals as a token or security card.

Referring now to FIG. 1. an illustration of an embodiment of the present invention mounted on a finger grip and adapted to be held around the neck of a user is shown. The access key is formed from a capacitive elastomer pad 4 mounted on a conductive finger grip 6 attached to a mounting strip 8. FIG. 2 is an illustration of an embodiment of the present invention that has the capacitive elastomer pad 4 mounted on a conductive ring 10. FIG. 3 is an illustration of an embodiment of the present invention having the pad 4 mounted on a conductive ergonomic computer stylus 12.

The capacitive elastomer compound used in the described preferred embodiment is R-2630—electrically conductive room temperature vulcanization, RTV, silicone. This compound is moldable and allows electricity to pass through, typically to a person holding the material. When pressed against the stainless steel ring surrounding a fingerprint sensor, such as the Apple Touch™ ID sensor, and the glass surface of the sensor, the molded compound pad 4 activates the sensor, which senses the human being in contact with the capacitive compound and conductive member 6, 10 or 12, and which then reads peaks and valleys 14 in the surface of the material as if it were a human finger. Small differences that result from the molding of the ridges 14 in the capacitive compound make each emulator surface unique such that each surface 4 can be uniquely identified in the same manner as a fingerprint.

The provision of a transferable "fingerprint" is useful in a number of regards. For example, a parent can provide limited access to a fingerprint controlled phone to kids for unlocking the phone and/or making purchasing. The novel identification means can also function as a skeleton access key to allow IT personnel/teachers to unlock multiple, company-issued or faculty-issued devices using the unique physical key, rather than a 4-digit code which can be retained by multiple individuals. The access keys are also well suited to be temporarily checked out with an automated device.

The access key of the present invention offers an additional step/layer of security in order to unlock all or a portion of a device. For example, the access key can function as a store manager's cash register key card which offers greater access to the UI or database (for returns, refunds, discounts, etc). Thus, individual's possessing the access key can log into devices for functions such as inventory-checking and transaction-processing, but not access manager-sensitive data.

The present invention is also particularly well suited to use as an employee identification means that allows for multiple layers of restricted iOS access. The possession of a particular key allows an employee to open the device, grant discounts, and access most apps. but limits their ability to make admin/settings changes. Finally, Executives and IT personnel are granted full access to every company-issued device.

In a similar fashion, the present invention can be used to provide a family-wide master key for a multi-user device that can be used to open each individual user's personal account when necessary. Each user has their own profile that limits their access in a preset fashion, except for the possessor of the access key. Ideally, such an embodiment will come with a notification to alert the user that their account has been accessed through the use of the key.

The present invention is also well suited to tracking the keys themselves or objects associated with the keys. Every time a key is scanned, information storing the circumstances of the key's scanning can be recorded in a central data base and cataloged over time. In such a case, scanning a key brings up certain information about the life of the key itself. Each key scan results in the saving of interesting metadata like time, location, and any notes or photos the user wants to include. By simply associating the key with an object, the key can he used to track and monitor the object in a confirmed individualized manner.

The present invention is also well suited to use in games or contests and can be used to bring an interesting physical element to the gaming experience. The keys can be used as tokens for games, where you can buy keys, which unlock certain areas, items, levels etc. in the game. The keys can be sold with a toolbox of other interactive parts that get used throughout the game to solve puzzles etc. In such an embodiment, the keys are constructed in a variety of interesting shapes, and function as collector's items. Players can then trade these keys with other players just like trading cards.

They keys of the present invention are well adapted to enhancing public displays and providing layered access. Keys can be used with tablet computers integrated into museum and gallery displays to provide additional information to visitors about collections without any modifications being made to the tablet. The emulator are contextual in that they know what exhibits or pieces the patron has already seen, and can recommend additional exhibits or pieces based upon your perceived preferences or reviews. These keys can unlock more information to patrons that check them put or purchase them. They can also he used as mementos or takeaways and used to promote interaction in public spaces.

The effectiveness of the key in providing access to a restricted system can be limited geographically or to particular periods of time using the location and clock features of the device. Thus, keys can be issued that expire over a period of time or are only effective in a particular region or given distance from a point of origin.

Referring now to FIG. 4, a flow chart of a method of providing limited access to system using a fingerprint sensor in accordance with an embodiment of the present invention is shown. The method begins in step 30 with the creating of a conductive token having surface features readable by a fingerprint sensor. Next, in step 31, the token is coupled to a user's body. This can he accomplished by mounting the token on a conductive member adapted to be held by a user as described in more detail above. In step 32, the fingerprint sensor is engaged with the token. The token is identified with device software in step 33 and the level of system access provided by token is determined in step 34. The device software also applies any applicable temporal or geographic limitations in step 35. Once the identification and verification of the token is complete, the device's software provides the appropriate level of system access in step 36. Finally, a record of any data associated with the token's use is made and the method ends in step 37.

The above described method allows a transferable form of authorization and identification to be implemented with a standard fingerprint reading system and, therefore, represents an improvement upon the prior art. Although there have been described particular embodiments of the present invention of a new and useful Fingerprint Emulator, it is not intended that such references be construed as limitations upon the scope of this invention except as set forth in the following claims.

What is claimed is:

1. An access key for a device having a fingerprint activated lock, said access key comprising:
   a first electrically conductive member having surface features formed on a surface thereof that can be recognized by said fingerprint activated lock as a fingerprint.

2. The access key of claim 1 further comprising a second electrically conductive member electrically coupled to said first electrically conductive member wherein said second electrically conductive member is adapted to be electrically coupled to a body of a user.

3. The access key of claim 2, wherein said second electrically conductive member is a ring and said first electrically conductive member is mounted on said ring.

4. The access key of claim 1 further comprising a conductive gripping portion electrically connected to said first electrically conductive member.

5. The access key of claim 1, wherein said first electrically conductive member is electrically connected to a conductive stylus.

6. The access key of claim 1, wherein said first electrically conductive member is constructed from an electrically conductive silicone.

7. The access key of claim 1, wherein said first electrically conductive member is constructed from a capacitive elastomer.

* * * * *